(12) United States Patent
Obersteiner et al.

(10) Patent No.: US 11,930,953 B2
(45) Date of Patent: Mar. 19, 2024

(54) APPARATUS AND METHOD FOR EXTRACTING JUICE FROM FOOD INGREDIENTS

(71) Applicant: KONINKLIJKE PHILIPS N.V., Eindhoven (NL)

(72) Inventors: Heimo Obersteiner, Klagenfurt (AT); Thomas Otti, Klagenfurt (AT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 553 days.

(21) Appl. No.: 17/250,144

(22) PCT Filed: Jun. 18, 2019

(86) PCT No.: PCT/EP2019/065951
§ 371 (c)(1),
(2) Date: Dec. 7, 2020

(87) PCT Pub. No.: WO2020/002038
PCT Pub. Date: Jan. 2, 2020

(65) Prior Publication Data
US 2021/0244225 A1    Aug. 12, 2021

(30) Foreign Application Priority Data
Jun. 25, 2018   (EP) .................................... 18179507

(51) Int. Cl.
*A47J 19/02* (2006.01)
*A47J 36/20* (2006.01)
(Continued)

(52) U.S. Cl.
CPC ............. *A47J 19/027* (2013.01); *A47J 36/20* (2013.01); *A47J 43/046* (2013.01); *A47J 43/0716* (2013.01)

(58) Field of Classification Search
CPC ........ A47J 19/027; A47J 36/20; A47J 43/046; A47J 43/0716; A47J 43/0722
(Continued)

(56) References Cited

U.S. PATENT DOCUMENTS 4,702,162 A * 10/1987 Sontheimer ............. A47J 43/06
99/511
5,690,021 A   11/1997 Grey
(Continued)

FOREIGN PATENT DOCUMENTS

CN   1108479 A   9/1995
CN   1255841 A   6/2000
(Continued)

OTHER PUBLICATIONS

International Search Report and Written Opinion dated Oct. 7, 2019 for International Application No. PCT/EP2019/065951 Filed Jun. 18, 2019.

*Primary Examiner* — Omar Flores Sanchez
(74) *Attorney, Agent, or Firm* — Maschoff Brennan

(57) ABSTRACT

Provided is an apparatus (100) for extracting juice from food ingredients. The apparatus comprises a container (102) for receiving the food ingredients; the container having a juice outlet (110). A blender tool is located inside the container which blends the food ingredients. A drive system (109) drives the blender tool for blending and spins the container to assist juice which is released from the food ingredients during blending to pass out of the container via the juice outlet. The drive system provides independent control over the driving of the blender tool and the spinning of the container respectively. Further provided is a method for extracting juice from food ingredients.

15 Claims, 6 Drawing Sheets

(51) Int. Cl.
*A47J 43/046* (2006.01)
*A47J 43/07* (2006.01)

(58) Field of Classification Search
USPC .......................................................... 99/511
See application file for complete search history.

(56) References Cited

U.S. PATENT DOCUMENTS

| | | |
|---|---|---|
| 6,817,750 B1 | 11/2004 | Sands |
| 8,877,273 B2 | 11/2014 | Padan |
| 9,675,101 B2 | 6/2017 | Conti |
| 2004/0194643 A1 | 10/2004 | Tikare |
| 2005/0056161 A1 | 3/2005 | Le Rouzic |
| 2009/0229478 A1* | 9/2009 | Wu ...................... B01D 21/26 |
| | | 210/512.1 |
| 2013/0312623 A1 | 11/2013 | Cheung |
| 2014/0216277 A1* | 8/2014 | Chen ..................... A47J 27/004 |
| | | 99/513 |
| 2014/0263783 A1* | 9/2014 | Benoit .................... A47J 43/06 |
| | | 241/100 |
| 2017/0164776 A1 | 6/2017 | Floessholzer |
| 2021/0244224 A1* | 8/2021 | Bonaccorso .......... A47J 19/027 |
| 2021/0244226 A1* | 8/2021 | Krall ..................... A47J 43/255 |
| 2023/0081848 A1* | 3/2023 | Milanese ................ A47J 19/02 |
| | | 99/511 |
| 2023/0148799 A1* | 5/2023 | Roberts ................. A47J 43/046 |
| | | 366/292 |
| 2023/0329472 A1* | 10/2023 | Zhou ..................... A47J 19/027 |

FOREIGN PATENT DOCUMENTS

| | | | | |
|---|---|---|---|---|
| CN | 1589720 A | 3/2005 | | |
| CN | 101594810 A | 12/2009 | | |
| CN | 101854839 A | 10/2010 | | |
| CN | 205410787 | 8/2016 | | |
| CN | 106308435 | 1/2017 | | |
| EP | 3851002 A4 * | 10/2021 | ........... | A47J 19/027 |
| FR | 2859617 | 3/2005 | | |
| FR | 2923697 | 5/2009 | | |
| JP | 2008104564 | 5/2008 | | |
| WO | 99/59454 | 11/1999 | | |
| WO | 2005092158 A2 | 10/2005 | | |
| WO | 2018086970 | 5/2018 | | |

* cited by examiner

APPARATUS AND METHOD FOR EXTRACTING JUICE FROM FOOD INGREDIENTS

CROSS REFERENCE TO RELATED APPLICATIONS

This application is the U.S. National Phase application under 35 U.S.C. § 371 of International Application No. PCT/EP2019/065951 filed Jun. 18, 2019, which claims the benefit of European Patent Application Number 18179507.1 filed Jun. 25, 2018. These applications are hereby incorporated by reference herein.

FIELD OF THE INVENTION

This invention relates to extraction of juice from food ingredients.

BACKGROUND OF THE INVENTION

In a well-equipped kitchen, there are currently several household appliances for preparing juices and smoothies. Such appliances have importance in terms of enabling convenient daily consumption of highly nutritious foodstuffs such as fruits, vegetables, nuts, seeds and herbs.

Centrifugal juicers are available, which are optimal for extracting liquids, e.g. juice, from food ingredients, such as hard fruits and vegetables. Such centrifugal juicers typically include a drum with a cutting portion located inside the drum. Food ingredients are pushed into the drum and onto the cutting portion while the drum is spinning. As well as assisting to extract juice from the food ingredients, the spinning of the drum serves to fling the juice towards the wall of the drum. The wall typically includes a filter having holes which are dimensioned to permit juice to flow out of the drum whilst preventing the remainder of the food ingredients, e.g. fruit pulp, from passing through the filter. Little attention is paid to the consistency of the food ingredients remaining inside the drum, which are often regarded as a byproduct for subsequent disposal.

Blenders, such as jar blenders or bar blenders, are typically used to make blends from fruits and vegetables, particularly smoothies. Such devices typically comprise a blender tool, such as a rotary cutter, which cuts the food ingredients into relatively small pieces and, at the same time, releases juice from the food ingredients. The texture or consistency of the resulting blend is important because this is what is intended to be consumed. However, the scope for adjusting the consistency of the blend is limited because conventional blenders do not permit the juice to be separated from the rest of the blended food ingredients.

Whilst it may be possible, in principle, to transfer the blended food ingredients to the drum of a centrifugal juicer in order to effect at least partial separation of the juice from the rest of the blend, such a transfer would be inconvenient and invariably entail some food wastage by, for instance, a portion of the blended food ingredients remaining in the bowl or jar in which the ingredients were blended. Moreover, the requirement for a kitchen to be equipped with both a blender and a centrifugal juicer means that available space on the kitchen workbench and/or in the cupboards is correspondingly decreased.

SUMMARY OF THE INVENTION

The invention is defined by the claims.

According to an aspect there is provided an apparatus for extracting juice from food ingredients, the apparatus comprising: a container having a cavity for receiving the food ingredients, and a wall which extends around the cavity; a blender tool in the cavity for cutting and/or grinding and/or shredding the food ingredients thereby to release juice from the food ingredients; a drive system for driving the blender tool and spinning the container so as to fling said juice towards the wall, wherein the drive system enables independent control of the driving of the blender tool and the spinning of the container; and a juice outlet included in the wall for permitting juice to flow out of the cavity.

The present invention is based upon the realization that the respective functionalities of a blender and a centrifugal juicer may be combined in a single apparatus by locating a blender tool inside a container, which container can be spun by a drive system. The drive system allows independent driving control of the blender tool and the container. Thus, blending only, juicing only, or the combination may be selected.

The blender tool releases juice from the food ingredients without requiring spinning of the container. The blender tool may, for instance, comprise a rotary cutter. Following blending, the container can be spun to assist juice to pass out of the juice outlet. Provision of both blending and centrifuging functionalities enables more precise tailoring of the consistency of the juice passing out of the juice outlet or the blended food ingredients within the cavity than can be achieved with a blender per se or a centrifugal juicer per se. Moreover, the desired consistency can be attained without the necessity to transfer the blended food ingredients to a centrifugal juicer, thus eliminating the food wastage associated with such a transfer.

The apparatus may comprise a control mechanism arranged to control the flow of juice out of the juice outlet. When blending without juice removal is desired, the control mechanism may be used to limit or prevent juice passing out of the juice outlet. On the other hand, the control mechanism may permit at least some juice to pass through the juice outlet so as to adjust the consistency of the blended food ingredients. Moreover, permitting juice to pass through the juice outlet means that the apparatus may be operated as a centrifugal juicer.

The apparatus may comprise a collection vessel for receiving juice from the cavity, the container being contained within the collection vessel. The collection vessel may assist operation of the apparatus as a centrifugal juicer because juice passing out of the cavity via the juice outlet may be conveniently collected in the collection vessel. The collection vessel may also be used to collect, for instance, juice which is removed from the cavity during the process of adjusting the consistency of the blended food ingredients.

The control mechanism may be arranged such as to retain juice in the cavity when the container is not spinning. Alternatively or additionally, the control mechanism may be arranged such as to permit flow of juice out of the juice outlet when the container is spinning. The control provided by the control mechanism may thus be automatic, caused by the spinning of the container. For blending only, i.e. when the container does not rotate, the control mechanism may retain juice within the cavity.

The control mechanism may be arranged to permit flow of juice out of the juice outlet after a predetermined period of spinning of the container. For example, the control mechanism may be triggered by a suitable control signal to allow juice to flow out of the juice outlet after a pre-set, e.g. user inputted, period of spinning. Alternatively or additionally, the control mechanism may be arranged to permit flow of juice out of the juice outlet upon a spinning speed of the container being reached.

The juice outlet may comprise a filter portion. The filter portion may permit further control over the consistency of the blended food ingredients or the juice passing out of the cavity due to food particles which are too large to pass through the apertures of the filter portion being retained within the cavity. The filter portion may, for instance, include a wire mesh or a perforated plate. The filter portion may, for example, be detachable from the wall, which may enable switching between finer and coarser filters, depending on the desired consistency of the filtered juice or blended food ingredients.

The control mechanism may comprise a blocking member for controllably covering or exposing the filter portion, the blocking member being displaceable relative to the filter portion. Control over the flow of juice out of the cavity may thus be achieved using the blocking member which can be displaced relative to the filter portion so as control the flow of juice therethrough. The apparatus may comprise a plurality of blocking members for respectively covering filter portions spaced at intervals around the wall, e.g. equally spaced intervals around the circumference of the wall. For example, the apparatus may comprise a pair of blocking members for respectively covering a pair of filter portions which oppose each other across the cavity.

The apparatus may comprise an insert which includes the blocking member or plurality, e.g. pair, of blocking members and which is rotatably mounted in the container. Rotation of the insert within the container may thus provide a convenient means of displacing the blocking member(s) relative to the filter portion(s). The insert may comprise a base portion which extends across the cavity and which carries the blocking member or plurality, e.g. pair, of blocking members; and a flow breaker member which is mounted on a periphery of the base portion and protrudes into the cavity. Spinning of the container and/or releasing of juice by the blender tool may cause a circular flow of food ingredients within the cavity. The flow breaker member may assist rotation of the insert using this flow of food ingredients. In this way, the displacement of the blocking member(s) relative to the respective filter portion(s), and thus controlling the flow of juice out of the cavity via the filter portion, may be effected by spinning the container and/or operation of the blender tool.

A rotation restrictor may be included in the apparatus which is adapted to restrict rotation of the insert between an aligned orientation in which the respective filter portion is covered by the blocking member and an open orientation in which the insert is rotated so as to at least partially uncover the respective filter portion. A biasing mechanism may be included in the apparatus which is adapted to urge the insert towards the aligned orientation. The biasing mechanism may thus assist to adopt the aligned configuration, e.g. when the filter portion is required to be covered during blending. The spinning of the container may, for example, overcome the bias of the biasing mechanism such that the open orientation is adopted and juice is able to flow out of the cavity via the filter portion during the spinning.

The drive system may be adapted to spin the container between 1500 and 4000 revolutions per minute. Such rotational speeds of the container may assist efficient extraction of juice from the food ingredients. The drive system may comprise a motor, i.e. a single motor, for rotating the blender tool and spinning the container.

According to a further aspect, there is provided a method for extracting juice from food ingredients, the method comprising: receiving food ingredients inside a container having a blender tool and a juice outlet; driving the blender tool to release juice from the food ingredients by cutting and/or grinding and/or shredding the food ingredients; and spinning the container such that juice flows out of the container via the juice outlet, wherein the driving and the spinning are controlled independently of each other.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
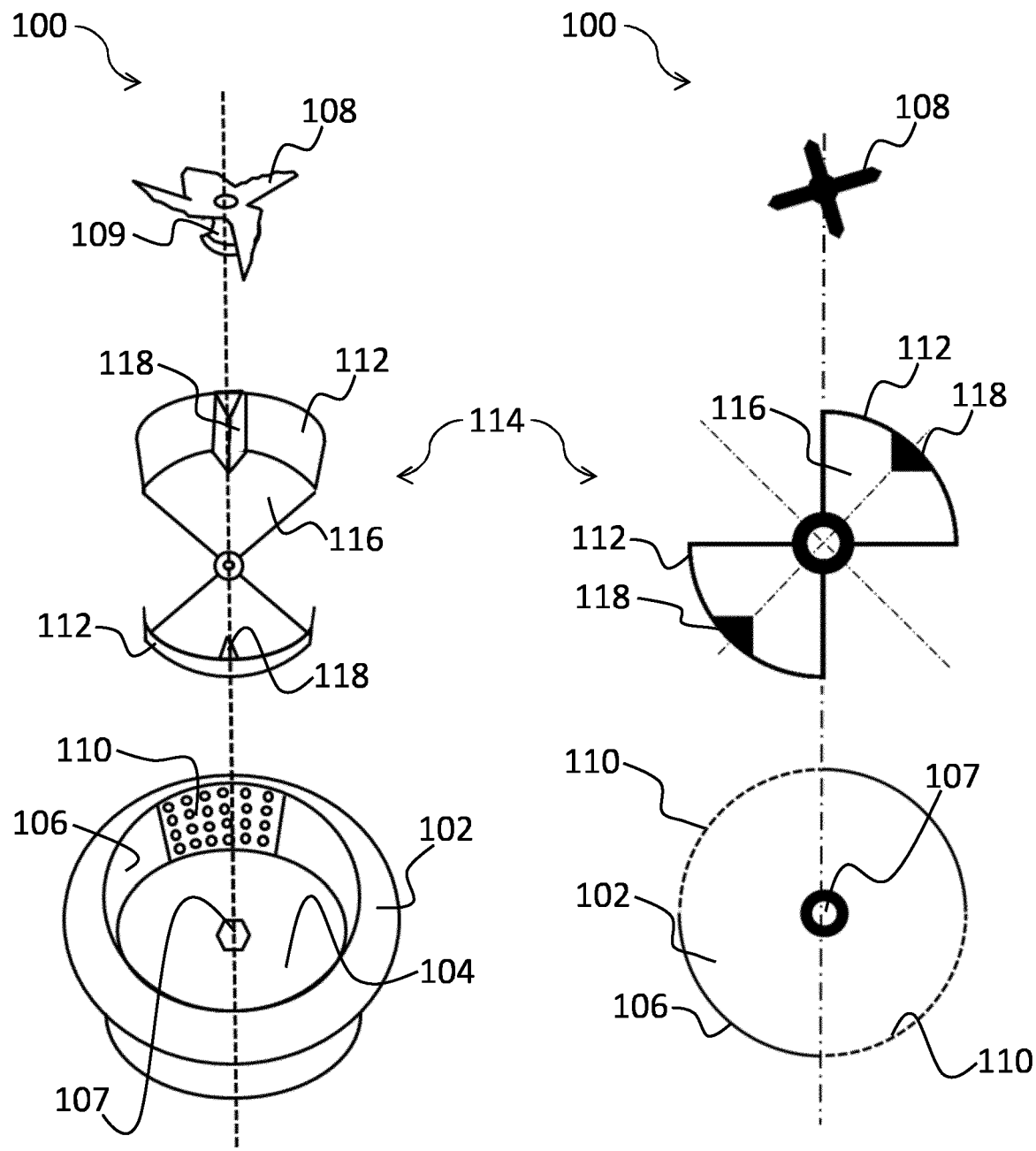
FIG. 1 shows component parts of an apparatus according to an embodiment.

The invention will be described with reference to the Figures. It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

Provided is an apparatus for extracting juice from food ingredients. The apparatus comprises a container for receiving the food ingredients; the container having a juice outlet. A blender tool is located inside the container which blends the food ingredients. A drive system drives, e.g. rotates, the blender tool for blending and spins the container to assist juice which is released from the food ingredients during blending to pass out of the container via the juice outlet. The drive system provides independent control over the driving, e.g. rotating, of the blender tool and the spinning of the container respectively.

The present invention is based upon the realization that the respective functionalities of a blender and a centrifugal juicer may be combined in a single apparatus by locating a blender tool inside a container, which container can be spun by a drive system. The drive system allows independent driving, e.g. rotation, control of the blender tool and the container. Thus, blending only, juicing only, or the combination may be selected.

Provision of both blending and centrifuging functionalities enables more precise tailoring of the consistency of the juice passing out of the juice outlet or the blended food ingredients within the cavity than can be achieved with a blender per se or a centrifugal juicer per se. Moreover, the desired consistency can be attained without the necessity to transfer the blended food ingredients to a centrifugal juicer, thus eliminating the food wastage associated with such a transfer.

The apparatus thus enables the user to produce smoothies as well as clear juices from food ingredients including fruits and vegetables, nuts, seeds and herbs. The blending functionality enables the device to produce thin- and thick-textured smoothies, vegetable mousses, creams and pastes. Combining the respective functionalities of a blender, i.e. a jar blender, and a centrifugal juicer in a single apparatus may also make for more efficient use of kitchen workbench and/or storage space than would be the case for separate provision of a blender and a centrifugal juicer.

Turning to FIG. 1, component parts of an apparatus 100 according to an embodiment are shown. The left hand pane of FIG. 1 shows a perspective view of each of the component parts, while the right hand pane of FIG. 1 shows a plan view of the respective parts. The apparatus 100 comprises a container 102 having a cavity 104 for receiving food ingredients (not shown in FIG. 1). A wall 106 extends around the cavity 104. Whilst not shown in FIG. 1, the wall 106 may further include a detachable lid which may be removed when food ingredients are to be placed inside the container 102, and replaced prior to blending. The lid may, for example, be completely removable from the container 102 or attached to the container 102 by a hinge, and so on.

Whilst the container 102 shown in the Figures has a bowl-like shape, with a cavity 104 having a circular cross-section as shown in, e.g., the right hand pane of FIG. 1, this is not intended to be limiting. The container 102 may have any suitable shape, although a circular or elliptical cross-section for the cavity 104 may assist efficient blending and flow of juice out of the cavity 104 during spinning of the container 102. The container 102 may, for example, be alternatively termed a "drum". The container 102 may be made of any suitable material, such as a polymer, metal or metal alloy. Stainless steel is preferable owing to its resistance to corrosion, particularly in view of the corrosion-promoting nature of acidic fruit juices to which the apparatus 100 may be routinely exposed.

A drive system (not shown in FIG. 1) spins the container 102, for instance, between 1500 and 4000 revolutions per minute in order to effect efficient extraction of juice from the food ingredients. The drive system may, for example, include an electrical motor which drives the rotation of the container 102 via a suitable drive shaft which engages with the container 102.

As shown in FIG. 1, a bottom part of the wall 106 may delimit a hole 107 through which an axle 109 may pass which engages with and drives the rotation of the blender tool 108. The blender tool 108 may thus be located in the centre of the container 102, although other positions are conceivable. The axle 109 may be driven by a suitable electrical motor.

In an embodiment, the same electrical motor may be used for rotating the blender tool 108 and spinning the container 102. Using the same electrical motor to rotate the blender tool 108 and to spin the container 102 may simplify the apparatus 100, and make the apparatus 100 cheaper to manufacture, i.e. relative to an apparatus 100 comprising separate electrical motors for respectively rotating the blender tool 108 and spinning the container 102.

The drive system provides independent control over the rotating of the blender tool 108 and the spinning of the container 102 respectively. When a single motor is used, in order to switch from rotating the blender tool 108 to spinning the container 102, a clutch arrangement may, for example, be used. The clutch arrangement may include an overrunning clutch or freewheel clutch which reacts to a change in rotational direction of the motor. Alternatively or additionally, a suitable gear box, e.g. including planetary gears, may be used.

The blender tool 108 may, for example, be rotated between 8000 and 20000 revolutions per minute in order to effect efficient blending of food ingredients in the cavity 104. Whilst the primary factor in determining the particle size, thus consistency, of the blended food ingredients is the duration of blending, i.e. a longer period of blending leads to smaller particles and a smoother consistency, the rotational speed of the blender tool 108 may also be an important factor. Higher rotational speeds of the blender tool 108 may result in the blended food ingredients comprising a greater proportion of smaller particles. The blending functionality may, for instance, enable disintegration of botanical foodstuffs to particle sizes smaller than 200 micrometers.

Any suitable blender tool 108 may be used, such as a rotary cutter. Such a rotary cutter may, for instance, comprise one or more blade portions made from a metal or metal alloy, such as stainless steel. Whilst the rotary cutter depicted in FIG. 1 has four blade portions, this is not intended to be limiting. A rotary cutter having one, two, three, five or more blade portions is equally conceivable. As shown in FIG. 1, the blade portions may be spaced relative to each other around the axle 109 and extend on different planes relative to each other. Other suitable blade arrangements will be immediately apparent to the skilled person.

The wall 106 of the container 102 has a juice outlet 110 through which juice may pass out of the cavity 104. Parts of the wall 106 which do not include the juice outlet 110 may be regarded as juice impermeable portions. The juice outlet 110 may correspondingly be regarded as a juice permeable portion. Accordingly, the majority, or preferably the entirety, of the juice which passes out of the cavity 104 passes out of the cavity 104 via the juice outlet 110.

The juice outlet 110 may comprise a filter portion, which may permit further control over the consistency of the blended food ingredients or the juice passing out of the cavity due to food particles which are too large to pass through the apertures of the filter portion being retained within the cavity. From here on, the same reference numeral, i.e. 110, will be used for the juice outlet and the filter portion.

The filter portion 110 may, for instance, include a wire mesh or a perforated plate. In an embodiment, the filter portion 100 is detachable from the wall 106, which may enable switching between finer and coarser filters, i.e. having respectively smaller and larger aperture sizes. The aperture size, e.g. diameter, may, for instance, range from 0.3 to 0.6 mm, depending on the desired fibrous content of the filtered juice.

When an adjustment to the consistency is required, the filter portion 110 may be detached, e.g. unclipped, from the wall 106, and a different filter portion 110 may be attached, e.g. clipped, to the wall 106. The wall 106 may, for instance, include a slot into which the filter portion 110 may be inserted and removed after use. Other means of detachably coupling the filter portion 110 to the wall 106 will be apparent to the skilled person. In this manner, yet another means is provided for adjusting the desired consistency of the filtered juice or blended food ingredients provided by the apparatus 100. Alternatively or additionally, the aperture size of the filter portion 110 may be adjustable, such that the coarseness of the filter portion 110 may be adjusted without the need to install another filter portion 110 having a different aperture size.

Control over the consistency of the blended food ingredients may thus be achieved by using one or more of, in order of decreasing influence over the consistency, the blending time, the rotational speed of the blender tool 108 and the aperture size in the filter portion 110. When the aperture size of the filter portion 100 is fixed, the consistency of the blended food ingredients or the filtered juice may be adjusted by varying the duration of the blending and/or the rotational speed of the blender tool 108, as previously described. Greater control over the consistency of the blended food ingredients or the filtered juice may be exerted by using different filter portions 110 having different aperture sizes relative to each other.

When the food ingredients are blended to a fine paste, the filtered juice passing out of the cavity 104 may have a relatively thick consistency, like a smoothie or a mousse, due to greater amounts of fibrous material passing through the filter portion 110. On the other hand, when the food ingredients are relatively coarsely blended, the filtered juice may have relatively low amounts of fibrous material, such that a relatively clear juice may pass through the filter portion 110. Accordingly, enhanced control over the texture of the filtered juice may be achieved by virtue of the combined blending and filtering capability of the apparatus 100.

The apparatus 100 may comprise a control mechanism 112 arranged to control the flow of juice out of the juice outlet 110. When blending without juice removal is desired, the control mechanism 112 may be used to limit or prevent juice passing out of the juice outlet 110. On the other hand, the control mechanism 112 may permit at least some juice to pass through the juice outlet 110 so as to adjust the consistency of the blended food ingredients.

The control mechanism 112 may be arranged such as to retain juice in the cavity 104 when the container 102 is not spinning, and to permit flow of juice out of the juice outlet 110 when the container 102 is spinning. The control provided by the control mechanism 112 may thus be automatic, caused by the spinning of the container 102. Thus for blending only, i.e. when the container does not rotate, the control mechanism 112 may retain juice within the cavity. The control mechanism 112 may include any suitable restrictor for controlling the passage of juice through the juice outlet 110, such as, for instance, a valve, a shutter slidably engaged with the wall 106 and which slides back and forth so as to cover and uncover the juice outlet 110, and so on.

In the embodiment shown in FIG. 1, the control mechanism 112 comprises a blocking member for controllably covering or exposing the filter portion 110, the blocking member 112 being displaceable relative to the filter portion 110. From here on, the same reference numeral, i.e. 112, will be used for the control mechanism and the blocking member. The blocking member 112 may be displaceable relative to the filter portion 110 so as control the flow of juice therethrough. The apparatus 100 may comprise a pair of blocking members 112 for respectively covering a pair of filter portions 110 which oppose each other across the cavity 104.

A plurality of filter portions 110 may increase the efficiency of juice filtering relative to a single filter portion 110.

The blocking member 112 or pair of blocking members 112 may be included in an insert 114 which is rotatably mounted in the container 102. Rotation of the insert 114 within the container 102 may thus provide a convenient means of displacing the blocking member(s) 112 relative to the filter portion(s) 110. The insert 114 may, for instance, be mounted on a suitable swivel mounting in the centre of the container 102. In a non-limiting example, the insert 114 may be manually rotated by the user so as to cover or uncover the filter portion 110. Alternatively or additionally, the insert 114 may be rotated using an electrical motor or by the flow of food ingredients in the cavity 104 resulting from spinning of the container 102 and/or blending using the blender tool 108, as will be further described below.

The insert 114 may be made of any suitable material, such as a polymer, metal or metal alloy. Preferably the insert is made of a polymer, such as polypropylene, such that the insert 114 is lightweight. A lightweight insert 114 may be particularly suited to being rotated by the flow of food ingredients in the cavity 104 resulting from spinning of the container 102 and/or blending using the blender tool 108, as will be described in more detail below. The insert 114 may be dimensioned such that the blocking member is sufficiently close to the wall 106 so as to limit or prevent leakage of juice through the respective filter portion 110 when it is covered by the blocking member 112. In this respect, the blocking member 112 may, for instance, additionally comprise a lip or gasket extending around the periphery of the blocking member 112 for assisting the blocking member 112 to sealingly cover the filter portion 110.

Figure 2:
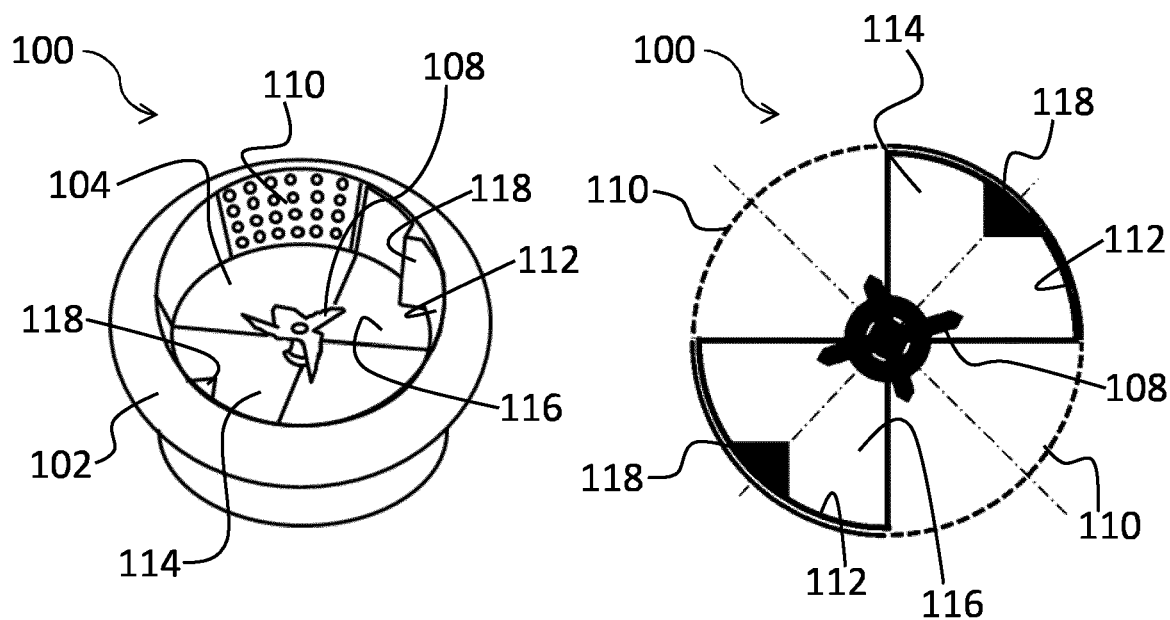
FIG. 2 shows the assembled component parts depicted in FIG. 1.
Figure 3:
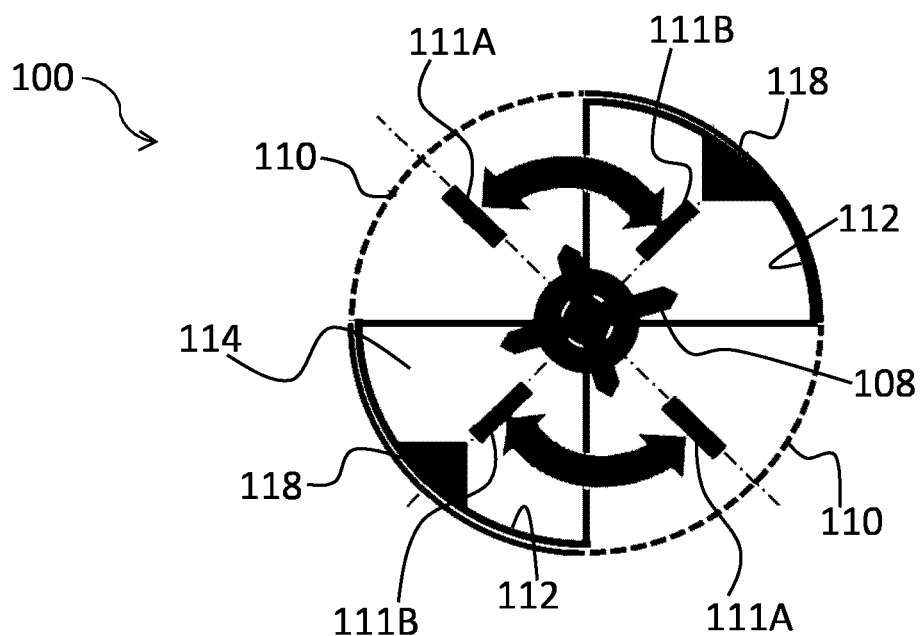
FIG. 3 schematically depicts rotation of the insert included in an apparatus according to an embodiment.

As shown in FIGS. 1 and 2, the apparatus 100 may be assembled by rotatably mounting the insert 114 and the blender tool 108 inside the container 102, as previously described. The double-headed arrows shown in FIG. 3 schematically depict the swiveling of the inert 114 within the container 102. The rectangular blocks show the respective positions of the insert when the filter portions 110 are covered 111A by the blocking members 112, and when the filter portions 110 are completely uncovered 111B. The insert 114 is thus arranged to swivel between these orientations 111A and 111B.

In an embodiment, the insert 114 comprises a base portion 116 which extends across the cavity 104 and which carries the blocking member 112 or pair of blocking members 112. As shown in the Figures, the insert 114 may comprise two opposing wing-like portions which respectively carry each of the blocking members 112. The pair of filter portions 110 may diametrically oppose each other across the cavity 104, and the blocking members 112 may be mounted on diametrically opposing parts of the base portion 116. Rotation of the insert 114 thus allows simultaneous covering/uncovering of the pair of filter portions 110.

Figure 4:
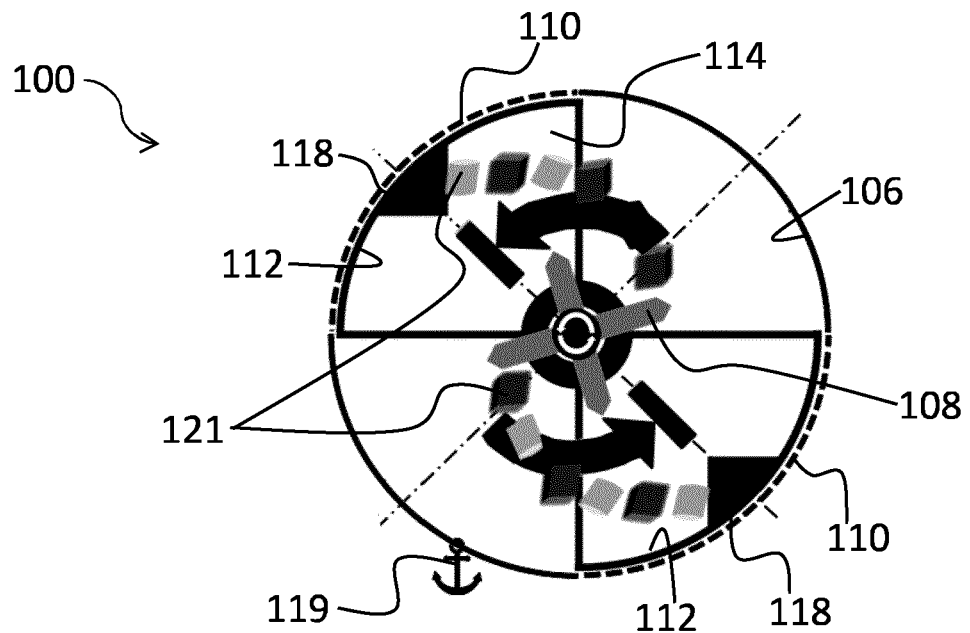
FIG. 4 schematically depicts rotation of the insert shown in FIG. 3 in response to blending of food ingredients.
Figure 5:
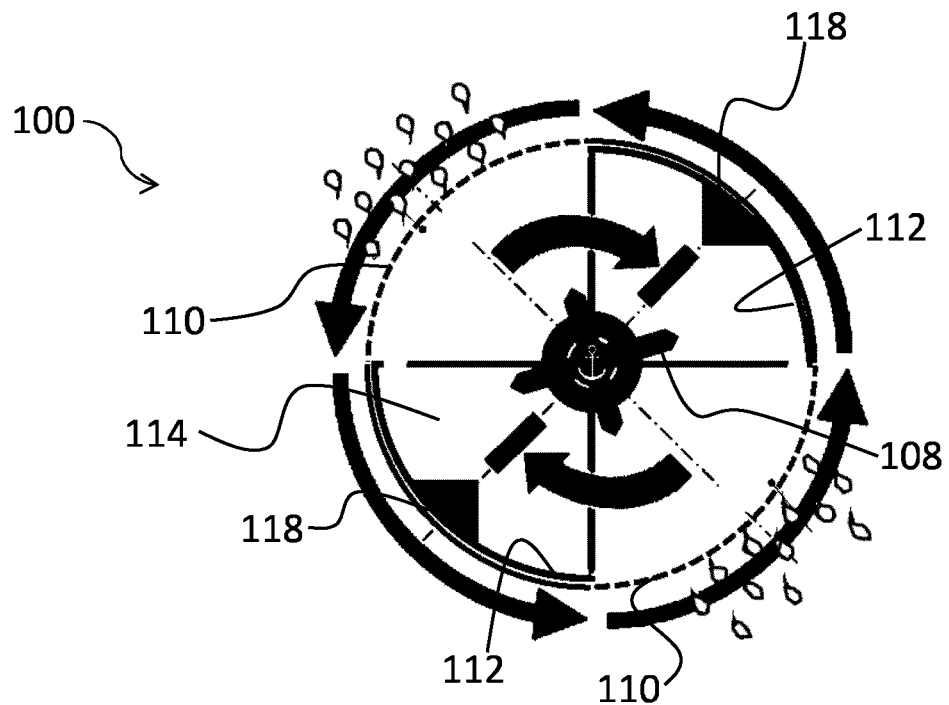
FIG. 5 schematically depicts rotation of the insert shown in FIG. 4 in response to spinning of the container.

In an embodiment, a flow breaker member 118 is mounted on a periphery of the base portion 116 and protrudes into the cavity 104. In the non-limiting example shown in the Figures, the insert 114 comprises two flow breaker members 118 which oppose each other across the cavity. Three, four or more flow breaker members 118 are also conceivable. The flow breaker member 118 may, for instance, protrude into the cavity 104 from an inner surface of the blocking member 112. As shown in FIGS. 4 and 5, spinning of the container 102 and/or releasing of juice by the blender tool 108 may cause a circular flow of food ingredients within the cavity 104. The circulating food ingredients may contact the flow breaker member 118 and cause the insert 114 to be rotated.

In this way, the displacement of the blocking member(s) 112 relative to the respective filter portion(s) 110 may be effected by spinning the container 102 and/or operation of the blender tool 104. The disrupting of the flow of food ingredients by the flow breaker member 118 may also assist in attaining more uniformly blended food ingredients, i.e. since larger particles may be diverted by the flow breaker member 118 from the periphery of the cavity 104 towards the blender tool 108 where they may undergo further disintegration. In this respect, the apparatus 100 may include further flow breaker members (not shown in the Figures) mounted, for instance, at the wall 106.

Whilst the flow breaker member 118 shown in the Figures is wedge-shaped, the shape of the flow breaker member 118 is not particularly limited providing it protrudes into the cavity 104 to a sufficient extent such that contact with the circulating food ingredients effects rotation of the insert 114. For example, the flow breaker member 118 may curve smoothly into the cavity 104 from the periphery of the insert 114.

FIG. 4 schematically depicts blending of the food ingredients 121 using the blender tool 108. The anchor 119 denotes that the container 102 is not spinning during the blending process. The blending of the food ingredients 121 using the blender tool 108 causes a circular flow of the food ingredients 121. By the food ingredients 121 flowing against the flow breaker members 118, the insert 114 may be caused to rotate from the orientation shown in FIG. 3 in which the filter portions 110 are completely open, to the orientation shown in FIG. 4 in which the filter portions 110 are completely covered by the blocking members 112. In this manner, the apparatus 100 shown in FIG. 4 may be regarded as adopting a blending configuration in which juice is prevented by the blocking members 112 from passing out of the cavity 104 via the filter portions 110.

As shown in FIG. 5, following blending, i.e. once the food ingredients have been blended to the desired consistency, the container 102 may spin. This may be regarded as a centrifugal juicing configuration. The switching from blending to centrifuging may be manual, i.e. the user may switch off the rotation of the blending tool via a suitable user interface, and switch on the container spinning via another user interface. Such user interfaces may include buttons, knobs, dials, a touch screen, and so on. Alternatively or additionally, the switching may be carried out by the apparatus 100 automatically, e.g. according to a predetermined blending and centrifuging routine which may be stored in a memory of the apparatus 100, and selected and initiated using a further user interface of the type mentioned above.

As shown in FIG. 5, the spinning of the container 102, as denoted by the arrows, may cause the insert 114 to rotate so as to uncover the filter portions 110. Juice may thus pass out of the cavity 104 via the filter portions 110. The rotation of the insert 114 from the orientation shown in FIG. 4 to that shown in FIG. 5 may be due to an inertial force exerted on the insert 114 when the container 102 starts to spin in the direction shown in FIG. 5.

Figure 6:
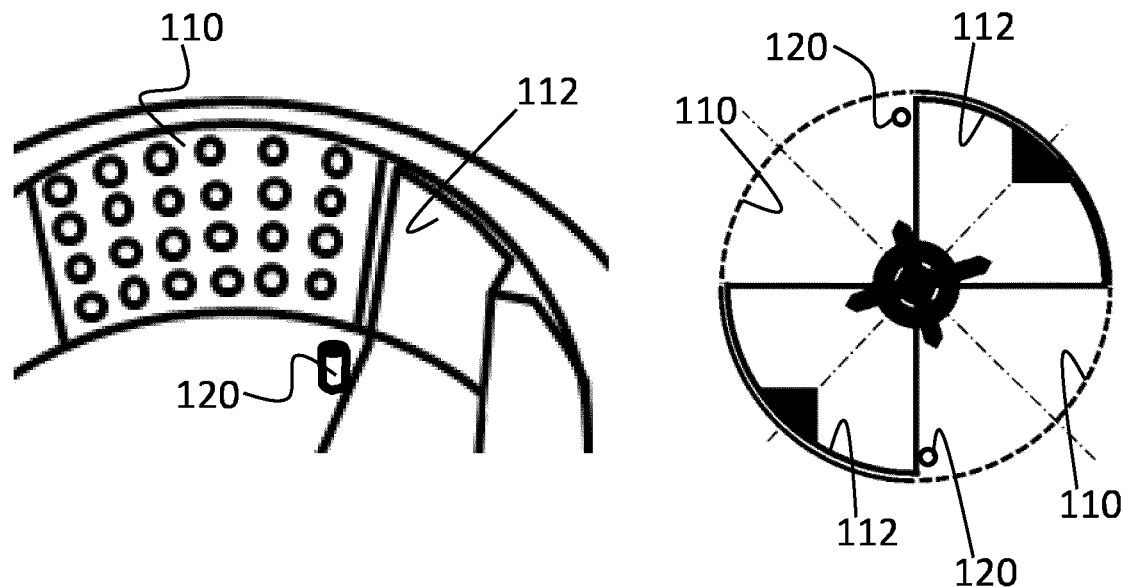
FIG. 6 shows views of an apparatus having a rotation restrictor according to an embodiment.
Figure 7:
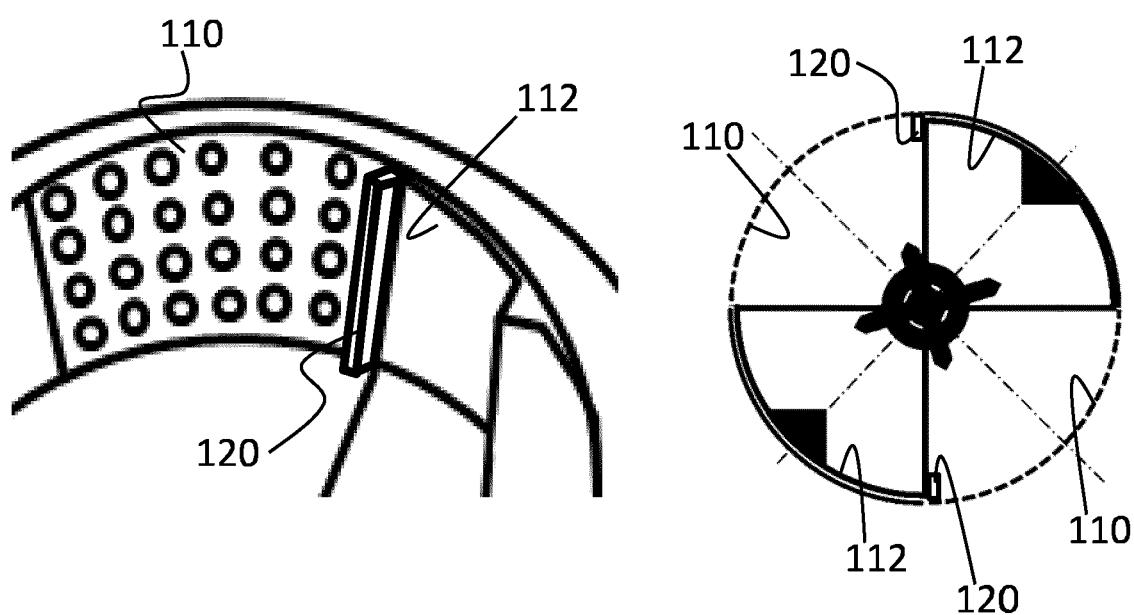
FIG. 7 shows views of an apparatus having a rotation restrictor according to another embodiment.

As shown in greater detail in FIGS. 6 and 7, the apparatus 100 may include a rotation restrictor 120 which restricts rotation of the insert 114 between an aligned orientation in which the respective filter portion 110 is covered by the blocking member 112 and an open orientation in which the insert 114 is rotated by up to 90° with respect to the aligned orientation so as to at least partially uncover the respective filter portion 110. As shown in FIG. 6, the rotation restrictor 120 may comprise pins protruding from a bottom part of the wall 106 into the cavity 104, and which, when in contact with the base portion 116, prevent further rotation of the insert 114. Alternatively, and as shown in FIG. 7, the rotation restrictor 120 may comprise ribs which project from a side part of the wall 106 into the cavity 104, and which, when in contact with the blocking member 112, prevent further rotation of the insert 114. The ribs may, for example, further serve to disrupt the flow of food ingredients in order to attain more uniformly blended food ingredients, i.e. since larger particles may be diverted by the ribs from the periphery of the cavity 104 towards the blender tool 108 where they may undergo further disintegration.

Whilst toggling between the respective aligned and open orientations may be achieved via rotation of the blender tool 108 and/or spinning of the container 102, or by manual adjustment by the user, the apparatus 100 may further include a biasing mechanism which urges the insert 114 towards the aligned orientation. In other words, the natural position of the insert 114 may be such that the blocking members 112 cover the filter portions 110.

The biasing mechanism may, for instance, be included in a spring-loaded swivel mounting for mounting the insert 114 in the container 102. The inertia of the insert 114 when the container 102 starts to spin may overcome the bias such that the insert 114 rotates so as to adopt the open orientation. During such rotation of the insert 114, the spring in the swivel mounting may be stretched and as soon as the spinning stops, the spring may pull the insert 114 back to its initial aligned orientation. Other suitable biasing mechanisms will be immediately apparent to the skilled person.

In this manner, no manual intervention may be required from the user in order to toggle between the aligned and open orientations of the insert 114. The biasing mechanism may thus assist to adopt the aligned configuration, e.g. when the filter portion 110 is required to be covered during blending. The spinning of the container 102 may, for example, overcome the bias of the biasing mechanism such that the open orientation is adopted and juice is able to flow out of the cavity 104 via the filter portion 110 during the spinning.

Figure 8:
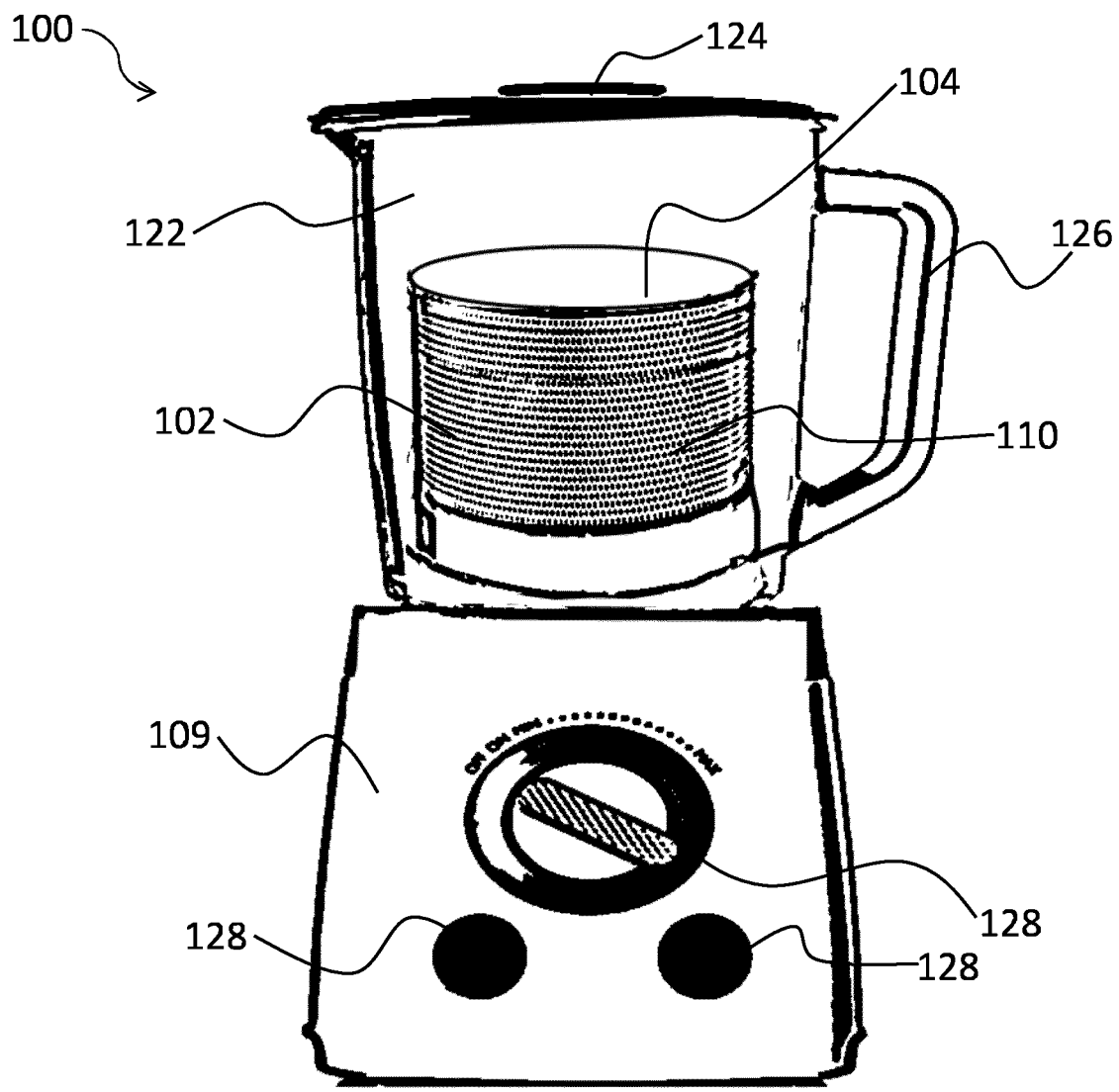
FIG. 8 shows an apparatus according to an embodiment.

Turning to FIG. 8, the apparatus 100 may comprise a collection vessel 122 for receiving juice from the cavity, the container 102 being contained within the collection vessel 122. The collection vessel 122 may assist operation of the apparatus 100 as a centrifugal juicer because juice passing out of the cavity 104 via the juice outlet 110 may be conveniently collected in the collection vessel 122. The collection vessel may be made of any suitable material, such as glass, a polymer, metal or metal alloy. The collection vessel 122 may also be used to collect, for instance, juice which is removed from the cavity 104 during the process of adjusting the consistency of the blended food ingredients. The collection vessel 122 may have a removable lid 124 which may be removed when placing food ingredients in the cavity 104 and removing, e.g. pouring, filtered juice and blended food ingredients from the collection vessel 122 and the container 102 respectively. The lid 124 may be replaced before blending or centrifuging.

Further evident in FIG. 8 is the exterior of the drive system 109 which rotates the container 102 and the blender tool 108. The collection vessel 122 may be detachable from the drive system 109, thereby facilitating, for example, pouring of the filtered juice into another receptacle. Moreover, the collection vessel 122 being detachable from the drive system 109 may facilitate cleaning of the collection vessel 122, container 102 etc. The collection vessel 122 may also comprise a handle 126 to assist with lifting the collection vessel 122 from the drive system 109. The apparatus 100 may include a user interface 128 for controlling the blender tool 108 and the spinning of the container 102, as previously described.

Figure 9:
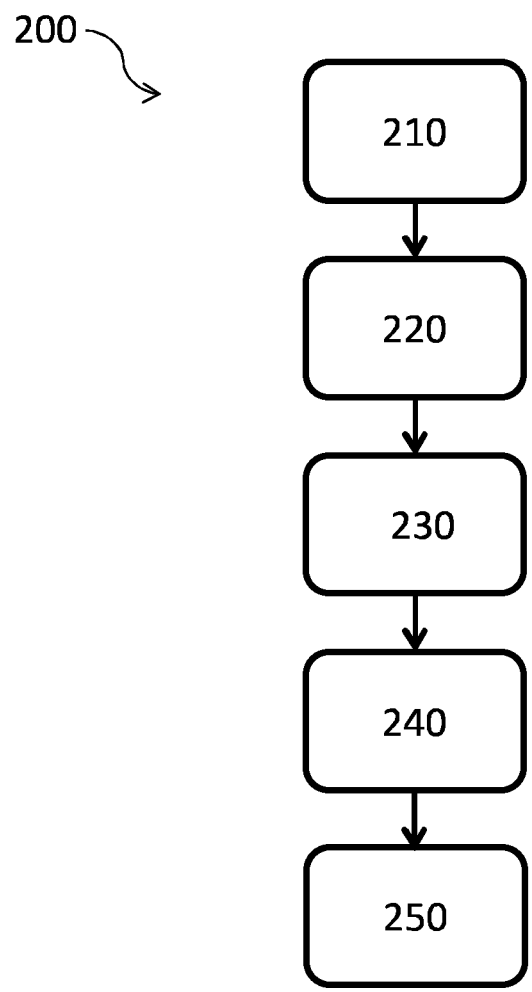
FIG. 9 shows a flowchart of a method for extracting juice from food ingredients according to an embodiment.

FIG. 9 shows a flowchart of a method 200 for extracting juice from food ingredients according to an embodiment. The method 200 commences in step 210. In step 220, food ingredients, e.g. fruit and/or vegetables, are received inside a container having a blender tool and a juice outlet. The blender tool is driven, e.g. rotated, in step 230 to release juice from the food ingredients. In step 240, the container is spun such that juice flows out of the container via the juice outlet. The driving 230 and the spinning 240 are controlled independently of each other. The method 200 terminates in step 250.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An apparatus for extracting juice from food ingredients, the apparatus comprising:
   a container having a cavity for receiving the food ingredients, and a wall which extends around the cavity;
   a blender tool in the cavity for cutting and/or grinding and/or shredding the food ingredients thereby to release the juice from the food ingredients;
   a drive system for driving the blender tool and spinning the container so as to fling said juice towards the wall, wherein the drive system enables independent control of the driving of the blender tool and the spinning of the container; and
   a juice outlet included in the wall for permitting the juice to flow out of the cavity.

2. The apparatus of claim 1, further comprising a control mechanism arranged to control the flow of juice out of the juice outlet.

3. The apparatus of claim 2, wherein the control mechanism is arranged to retain the juice in the cavity when the container is not spinning.

4. The apparatus of claim 2, wherein the control mechanism is arranged to permit the flow of juice out of the juice outlet when the container is spinning, and wherein the control mechanism is arranged to permit the flow of juice out of the juice outlet after a predetermined period of spinning of the container and/or upon a predetermined spinning speed of the container being reached.

5. The apparatus of claim 2, wherein the juice outlet comprises a filter portion, and wherein the control mechanism comprises a blocking member for controllably covering or exposing the filter portion, the blocking member being displaceable relative to the filter portion.

6. The apparatus of claim 5, further comprising a plurality of blocking members for respectively covering filter portions spaced at intervals around the wall.

7. The apparatus of claim 5, further comprising an insert which includes the blocking member or a plurality of blocking members, wherein the insert is rotatably mounted in the container.

8. The apparatus of claim 7, wherein the insert comprises:
   a base portion which extends across the cavity, wherein the base portion carries the blocking member or the plurality of blocking members; and
   a flow breaker member which is mounted on a periphery of the base portion and protrudes into the cavity.

9. The apparatus of claim 7, further comprising a rotation restrictor adapted to restrict rotation of the insert between an aligned orientation in which the respective filter portion is covered by the blocking member and an open orientation in which the insert is rotated so as to at least partially uncover the respective filter portion.

10. The apparatus of claim 9, further comprising a biasing mechanism adapted to urge the insert towards the aligned orientation.

11. The apparatus of claim 1, further comprising a collection vessel for receiving the juice from the cavity, the container being contained within the collection vessel.

12. The apparatus of claim 1, wherein the drive system is adapted to spin the container between 1500 and 4000 revolutions per minute.

13. The apparatus of claim 1, wherein the blender tool comprises a rotary cutter.

14. The apparatus of claim 1, wherein the drive system comprises a motor for rotating the blender tool and spinning the container.

15. A method for extracting juice from food ingredients, the method comprising:
   receiving the food ingredients inside a container having a blender tool and a juice outlet;
   driving the blender tool to release the juice from the food ingredients by cutting and/or grinding and/or shredding the food ingredients; and
   spinning the container such that the juice flows out of the container via the juice outlet, wherein the driving and the spinning are controlled independently of each other.

* * * * *